Sept. 19, 1961 H. M. GEYER 3,000,357
HIGH TEMPERATURE HYDRAULIC ACTUATOR ASSEMBLY
Filed Dec. 19, 1958 2 Sheets-Sheet 1

INVENTOR.
Howard M. Geyer
BY
W. E. Finkom
His Attorney

Sept. 19, 1961   H. M. GEYER   3,000,357
HIGH TEMPERATURE HYDRAULIC ACTUATOR ASSEMBLY
Filed Dec. 19, 1958   2 Sheets-Sheet 2

INVENTOR.
Howard M. Geyer
BY
*W. E. Finken*
His Attorney

United States Patent Office 3,000,357
Patented Sept. 19, 1961

3,000,357
HIGH TEMPERATURE HYDRAULIC ACTUATOR ASSEMBLY
Howard M. Geyer, Dayton, Ohio, assignor to General Motors Corporation, Detroit, Mich., a corporation of Delaware
Filed Dec. 19, 1958, Ser. No. 781,572
7 Claims. (Cl. 121—38)

This invention pertains to actuators, and particularly to synchronized hydraulic actuators designed for use in high ambient temperatures.

Heretofore, it has been proposed to cool hydraulically operated actuators by continuously circulating hydraulic fluid through the parts exposed to ambient temperatures in the range of 1000° F. In prior constructions, pressure drop bushings have been embodied between relatively movable parts, which pressure drop bushings form self-cleaning orifices. However, in prior structures such as the type shown in my copending applications Serial No. 681,033, now Patent No. 2,935,048, and Serial No. 708,490, now Patent No. 2,955,574, filed August 29, 1957, and January 13, 1958, respectively, substantial lengths of externally mounted tubing are required. The present invention relates to an improved hydraulically cooled actuator assembly utilizing a minimum of external tubing which is exposed to high ambient temperature. Accordingly, among my objects are the provision of a hydraulic actuator assembly including constant flow valve means for controlling the flow of circulating fluid; the further provision of an actuator assembly designed for synchronized operation with other like actuators including means for circulating cooling fluid therethrough; and the still further provision of an actuator assembly including tandem arranged pistons and means for circulating cooling fluid through the major portion of the exposed piston rod thereof.

The aforementioned and other objects are accomplished in the present invention by incorporating a pair of constant flow valves within the actuator assembly for controlling the flow of cooling fluid therethrough. Specifically, the actuator includes a fixed cylinder assembly having an intermediate annular bulkhead. The bulkhead divides the cylinder into two work cylinders within which a pair of interconnected reciprocable pistons are disposed. One of the pistons carries a nut which threadedly engages a screw shaft disposed within one of the working cylinders. The screw shaft is attached to a worm gear which meshes with a worm, the worm being attached to a synchronized shaft which mechanically interconnects the screw shafts of adjacent like actuators.

The inboard piston is attached to an oil circulation tube concentrically disposed within the piston rod interconnecting the two pistons. The circulation tube has four flats milled thereon so as to form passages for the flow of cooling fluid, and interconnects the retract chambers of the two working cylinders. The extend chambers of the two working cylinders interconnect through the hollow screw shaft and a circulation tube concentrically mounted within the hollow piston rod which extends outside of the cylinder assembly.

A first constant flow valve is embodied in the actuator head cap and communicates at all times with the extend chambers of the two working cylinders. The constant flow valve is of a conventional type and includes a servo actuated spring biased piston for controlling the flow of fluid through a small orifice. A second constant flow valve is embodied in the actuator tail cap, the second constant flow valve communicating at all times with the retract chambers of the two working cylinders. The outlet ports of the two constant flow valves are connected to drain tubes.

The extend chambers of the working cylinders are connected to an extend port which is constituted by the conduit within which the synchronizing shaft is disposed in accordance with the teaching in my Patent No. 2,657,-539. The retract port is formed in the actuator tail cap. In operation, fluid under pressure is either simultaneously applied to both extend chambers of the working cylinders while both retract chambers are connected to drain, or vice versa, so as to effect movement of the interconnected pistons in either direction. Since the inboard piston is drivingly connected with the screw shaft, movement of the pistons is dependent upon and effects rotation of the screw shaft and hence the synchronizing shaft which is geared thereto. When the retract chambers and the extend chambers of the working cylinders are subjected to pressure, cooling fluid will circulate through the chambers at a substantially constant rate to drain through the constant flow valves, thereby maintaining the temperature of the actuator within reasonable limits.

Further objects and advantages of the present invention will be apparent from the following description, reference being had to the accompanying drawings; wherein a preferred embodiment of the present invention is clearly shown.

Figure 1:
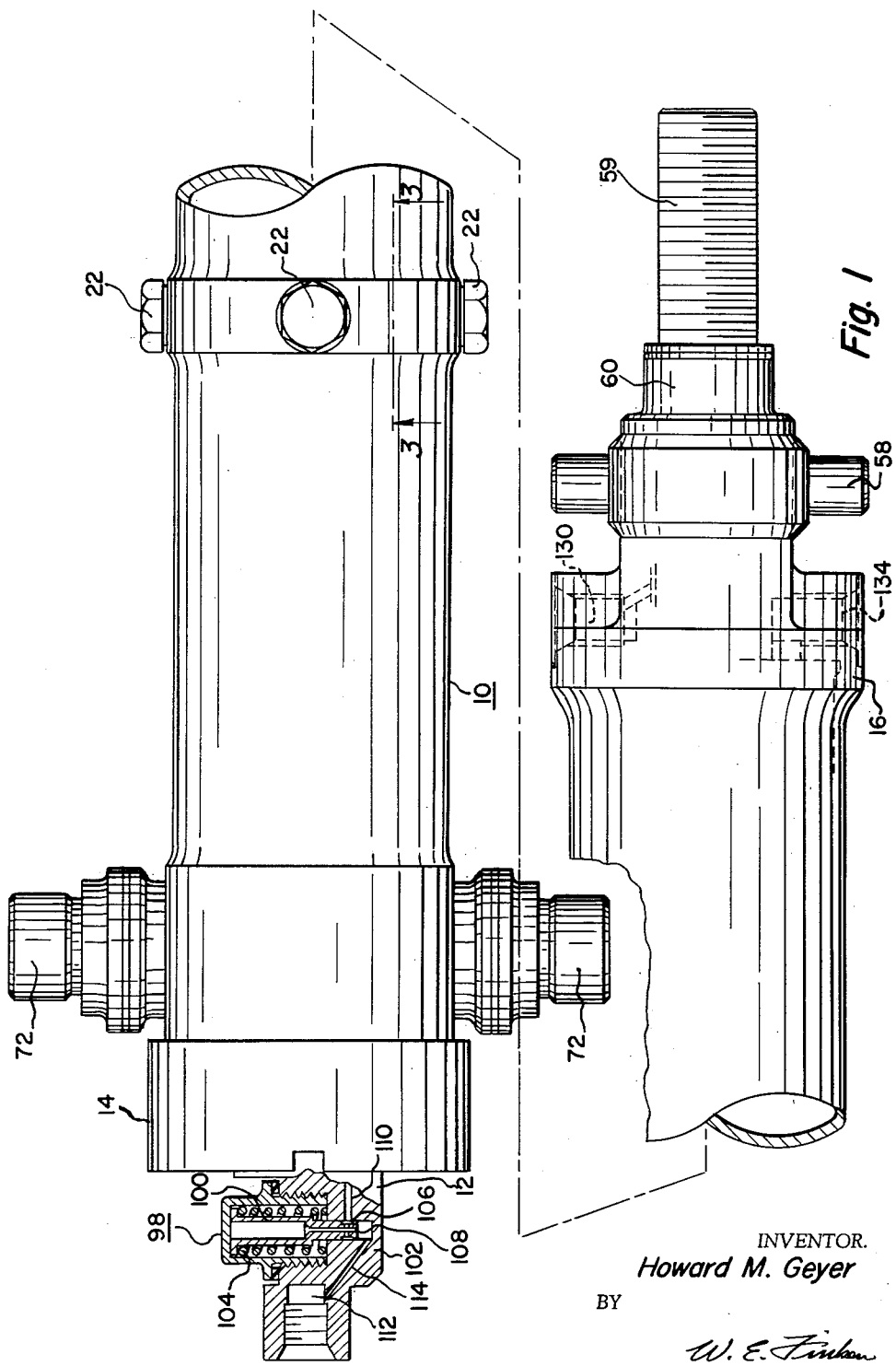
FIGURE 1 is a view, partly in section and partly in elevation, of an actuator constructed according to the present invention.
Figure 2:
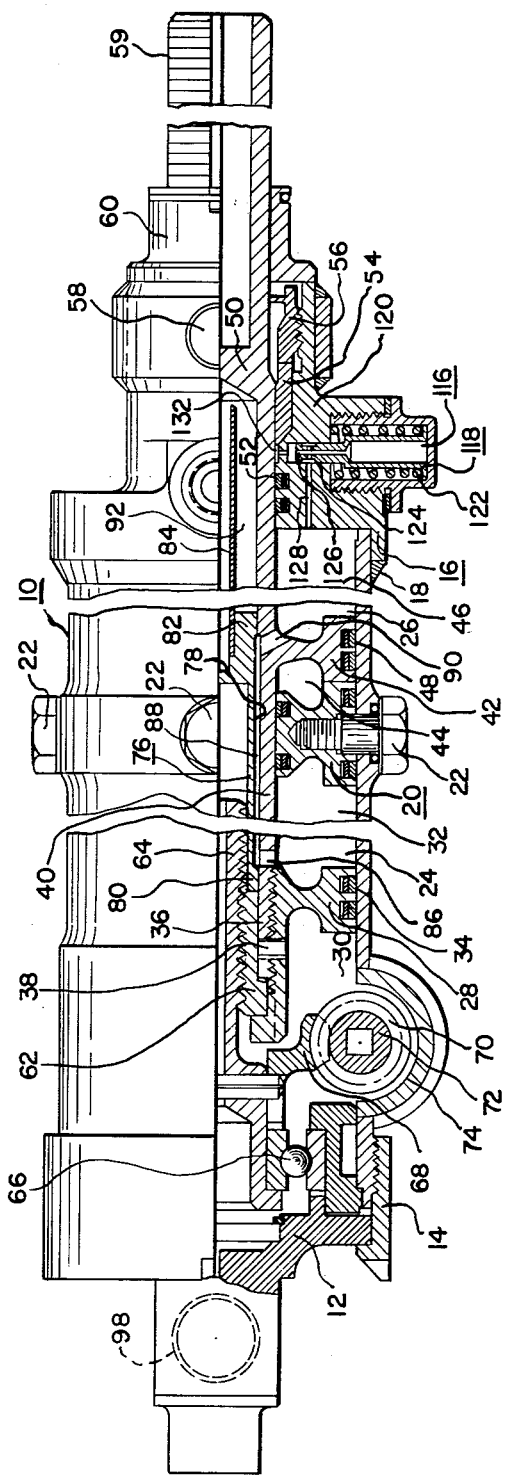
FIGURE 2 is a view, partly in section and partly in elevation.

With particular reference to FIGURES 1 and 2, an actuator is shown including a cylinder assembly 10 adapted for connection to a fixed support, not shown. The cylinder assembly includes a head end cap 12 attached to one end of the cylinder assembly by means of a nut 14. A tail end cap 16 is attached to the rod end of the cylinder by means of a weld 18. An annular bulkhead 20 is mounted within the cylinder by means of a plurality of bolts 22, the bulkhead 20 dividing the cylinder assembly into a pair of working cylinders 24 and 26. The working cylinder 24 contains a reciprocable piston 28 which divides the working cylinder 24 into an extend chamber 30 and a retract chamber 32. The piston 28 has suitable metallic piston rings 34 and is connected by means of threads 36 and a pin 38 to a piston rod 40 which extends through and sealingly engages the annular bulkhead 20. The piston rod 40 is integral with an outboard piston 42 disposed within the outboard working cylinder 26. The piston 42 divides the outboard working cylinder 26 into an extend chamber 44 and a retract chamber 46, and likewise carries metallic piston rings 48 which sealingly engage the inner walls of the cylinder assembly 10. The inboard and outboard pistons 28 and 42, respectively, are arranged in tandem whereby the over-all diameter of the actuator can be maintained rather small for the load to be moved, since the hydraulic forces acting on the two pistons are additive.

The piston rod 40 has a closed outer end indicated by numeral 50, and extends through the tail cap 16. The tail cap 16 carries suitable metallic piston rings 52, and supports low pressure metallic sealing rings 54 which are held in assembled relation with the tail cap by a nut 56. A supporting trunnion assembly 58 is welded to the tail cap as shown in FIGURE 1. The extending end of the piston rod 40 is threaded as indicated by numeral 59 and can be attached to any suitable load device, not shown. The outer end of the piston rod 40 also carries a nut 60, the position of which can be adjusted to vary the stroke of the actuator by determining the retract stroke end position.

The inboard piston 28 is rigidly connected to an internal nut 62 which threadedly engages a hollow Acme screw 64. The screw shaft 64 is supported for rotation relative to the cylinder assembly by a ball bearing assembly 66, and is pinned to a worm gear 68. The worm gear meshes with a worm 70 attached to a synchronizing shaft 72 which extends outside of the actuator. The synchronizing shaft interconnects the screw shafts of like actuators for mechanically synchronizing the movement thereof. In addition, the synchronizing shaft is enclosed in a conduit indicated by the numeral 74 which constitutes the extend port for the actuator.

Figure 4:
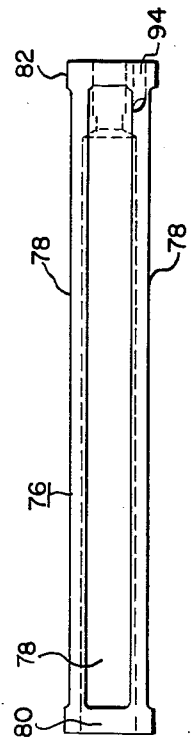
FIGURE 4 is a view in elevation of the oil circulation tube attached to the inboard piston.

An oil circulation tube 76 is brazed to the inboard piston 28 and is concentrically disposed between the screw shaft 64 and the piston rod 40. As seen in FIGURES 2 and 4, the oil circulation tube 76 has four flats 78 milled on the exterior thereof and annular end portions 80 and 82. A second circulation tube 84 is brazed to the annular portion 82 of the circulation tube 76, the circulation tube 84 being concentrically disposed within the outer section of the piston rod 40.

Figure 3:
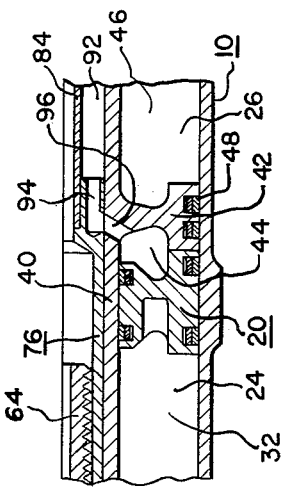
FIGURE 3 is a fragmentary sectional view taken along line 3—3 of FIGURE 1.

As seen in FIGURE 2, piston rod 40 has four radial ports 86 which interconnect the inboard retract chamber 32 with the passages 88 formed between the flats 78 and the piston rod 40. The piston rod 40 also has four ports 90 interconnecting the passages 88 with the outboard retract chamber 46. The inboard extend chamber 30 is connected to the outboard extend chamber 44 through the hollow screw shaft 64, the circulation tube 84, the annular channel 92 between the tube 84 and the piston rod 40, FIGURE 2, and sets of mating passages 94 and 96 in the circulation tube 76 and the piston rod 40, respectively, as seen in FIGURE 3.

With particular reference to FIGURE 1, the head cap assembly 12 supports a constant flow valve indicated generally by the numeral 98. The constant flow valve comprises a hollow plunger 100 supported for reciprocable movement in a body 102. The plunger 100 is normally biased to the position shown in FIGURE 1 by a coil spring 104, and is formed with transverse ports 106 and a metering orifice 108. The ports 106 connect with a passage 110, the passage 110 communicating with extend chambers 30 and 44. The metering orifice 108 communicates with drain port 112 through a passage 114. The constant flow valve operates in a known manner, and thus, a constant pressure head is maintained on the pressure side of the orifice 108 due to the opposing spring and hydraulic forces which control the position of the plunger 100 whereby a constant flow of hydraulic fluid is permitted from the extend chambers 30 and 44 to the drain port 112.

An identical constant flow valve assembly 116 is embodied in the tail cap assembly 16, the constant flow valve assembly 116 including a hollow plunger 118 mounted for reciprocable movement in a valve body 120 and normally biased to the position shown by compression spring 122. The plunger 118 includes transverse ports 124 and a metering orifice 126, the ports 124 connecting with a passage 128 and the retract chambers 32 and 46. The orifice 126 is connected to drain port 130 through an annular groove 132. In addition, the tail cap assembly 16 is formed with a retract port 134.

Operation of the actuator is as follows. Assuming the actuator to be fully retracted as shown in FIGURE 2, if the extend chambers are subjected to hydraulic fluid under pressure, and the retract chambers are connected to drain, the pistons 28 and 42 will move to the right. Movement of the pistons is dependent upon and effects rotation of the screw shaft 64 which, in turn, effects rotation of the synchronizing shaft 72. When the pistons have been moved to the selected position, either fully extended or fully retracted, they are held against movement by hydraulic pressure. Assuming that the actuator is subjected to a compression load, the extend chambers must be maintained under greater pressure than the retract chambers. However, the retract chambers will also be maintained under slight pressure. The constant flow valves permit a substantially constant rate of flow irrespective of the pressure potential to which the extend and retract chambers are subjected.

Thus, when the extend chambers are subjected to pressure, oil will continuously circulate from the extend chamber 44 through the passages 96 and 94, the passage 92, the drain tube 84, through the hollow screw shaft 64 and also from the extend chamber 30 through the passage 110 and the constant flow valve 98 to the drain port 112. When the retract chambers are pressurized, oil will continuously be circulated through the retract chamber 32, the ports 86, and the passages 88, the ports 90, and the retract chamber 46 through the passage 128 and the constant flow valve 116. Inasmuch as the actuator chambers are connected internally, the amount of external tubing required will be maintained at a minimum, which feature is highly desirable since the external tube which is exposed to the high ambient temperatures heats rapidly and reduces the efficiency of the circulating cooling fluid.

While the embodiment of the invention as herein disclosed constitutes a preferred form, it is to be understood that other forms might be adopted.

What is claimed is as follows:

1. An actuator assembly including, a cylinder, a reciprocable piston disposed in said cylinder and dividing said cylinder into opposed chambers, and a constant flow valve fluidly connected with each chamber whereby cooling fluid will be circulated at a substantially constant rate through said cylinder when said chambers are pressurized.

2. An actuator assembly including, a cylinder, a reciprocable piston disposed in said cylinder and dividing said cylinder into an extend chamber and a retract chamber, an extend port communicating with said extend chamber, a retract port communicating with said retract chamber, and a constant flow valve fluidly connected with each chamber whereby cooling fluid will be circulated at a substantially constant rate through said cylinder when said chambers are pressurized.

3. An actuator assembly including, a cylinder assembly, an intermediate bulkhead disposed in said cylinder assembly and dividing said cylinder assembly into a pair of working cylinders, a pair of interconnected tandem arranged reciprocable pistons disposed in said working cylinders, each piston dividing its respective working cylinder into an extend chamber and a retract chamber, means fluidly interconnecting the extend chambers and the retract chambers of said working cylinders internally of said cylinder assembly, and a pair of constant flow valves, one of said constant flow valves being fluidly connected with said extend chambers and the other of said constant flow valves being fluidly connected to said retract chambers whereby cooling fluid will be circulated through said working cylinders when said chambers are pressurized.

4. An actuator assembly including, a cylinder assembly, an intermediate annular bulkhead disposed in said cylinder assembly and dividing said cylinder assembly into a pair of working cylinders, a pair of interconnected tandem arranged reciprocable pistons disposed in said working cylinders, each piston dividing its respective working cylinder into an extend chamber and a retract chamber, a hollow screw shaft rotatably journalled within said cylinder assembly, means operatively interconnecting one of said pistons and said screw shaft whereby movement of said pistons is dependent upon and effects rotation of said screw shaft, means including said hollow screw shaft fluidly interconnecting the extend chambers and the retract chambers internally of said cylinder assembly, a pair of constant flow valves, one of said constant flow valves being fluidly connected with said extend chambers and the other of said constant fluid valves being fluidly connected with said retract chambers whereby cooling fluid will be circulated through said working cylinders when said chambers are pressurized.

5. An actuator assembly including, a cylinder assembly, an intermediate annular bulkhead disposed in said cylinder assembly and dividing said cylinder assembly into a pair of working cylinders, a reciprocable piston disposed in each working cylinder and dividing its respective working cylinder into an extend chamber and a retract chamber, a hollow piston rod interconnecting said pistons for movement in unison, said piston rod having a closed outer end, a first tube disposed within said piston rod and arranged concentric thereof, said tube having at least one external flat terminating short of its ends so as to form a passage between said tube and said piston rod, ports in said piston rod interconnecting the retract chambers of said cylinders with said passage whereby said retract chambers are fluidly connected internally of said cylinder assembly, a second tube attached to said first tube within said piston rod and terminating short of the closed outer end of said piston rod, said second tube being radially spaced from the inner wall of said hollow piston rod to form an annular space therebetween and port means in said first tube and said piston rod interconnecting one of said extend chambers with the annular space between said second tube and said piston rod, the interior of said second tube being connected to the other extend chamber whereby said extend chambers are fluidly interconnected internally of said cylinder assembly.

6. An actuator assembly including, a cylinder assembly, an intermediate annular bulkhead disposed in said cylinder assembly and dividing said cylinder assembly into a pair of working cylinders, a reciprocable piston disposed within each working cylinder and dividing each working cylinder into an extend chamber and a retract chamber, a hollow piston rod rigidly interconnecting said pistons for movement in unison, a first tube disposed within said hollow piston rod and concentric therewith, a second tube attached to said first tube and radially spaced from the inner wall of said hollow piston rod, port means through said piston rod communicating with the interior of the piston rod and one of said extend chambers, port means through said first tube and said piston rod communicating with the other of said extend chambers and the annular space between the inner wall of said piston rod and said second tube whereby said extend chambers are fluidly interconnected, and internal passage means fluidly interconnecting the retract chambers of said working cylinders.

7. The actuator assembly set forth in claim 6 wherein the piston rod has a closed outer end, and wherein said second tube terminates short of the closed outer end of said piston rod whereby fluid flowing to or from said extend chambers will circulate throughout substantially the entire length of said hollow piston rod.

References Cited in the file of this patent
UNITED STATES PATENTS

| | | |
|---|---|---|
| 2,217,239 | Smith | Oct. 8, 1940 |
| 2,383,082 | Rossmann | Aug. 21, 1945 |
| 2,688,313 | Bauer | Sept. 7, 1954 |
| 2,739,571 | Hall | Mar. 27, 1956 |
| 2,806,450 | Geyer | Sept. 17, 1957 |
| 2,851,994 | Fagge | Sept. 16, 1958 |